(12) United States Patent
Larson

(10) Patent No.: US 9,027,858 B2
(45) Date of Patent: May 12, 2015

(54) TWO-COMPONENT SPRAY DEVICE AND USE THEREOF

(75) Inventor: John Charles Larson, West Chester, PA (US)

(73) Assignee: Axalta Coating Systems IP Co., LLC, Wilmington (DE)

( * ) Notice: Subject to any disclaimer, the term of this patent is extended or adjusted under 35 U.S.C. 154(b) by 374 days.

(21) Appl. No.: 13/519,958

(22) PCT Filed: Oct. 20, 2010

(86) PCT No.: PCT/US2010/053294
§ 371 (c)(1),
(2), (4) Date: Jun. 29, 2012

(87) PCT Pub. No.: WO2011/100003
PCT Pub. Date: Aug. 18, 2011

(65) Prior Publication Data
US 2012/0273595 A1 Nov. 1, 2012

Related U.S. Application Data

(60) Provisional application No. 61/304,524, filed on Feb. 15, 2010.

(51) Int. Cl.
*B05B 1/30* (2006.01)
*B05B 7/24* (2006.01)
*B05B 12/00* (2006.01)
*B29B 7/74* (2006.01)
(Continued)

(52) U.S. Cl.
CPC .............. *B05B 7/2408* (2013.01); *B05B 1/3066* (2013.01); *B05B 7/2472* (2013.01); *B05B 7/2478* (2013.01); *B05B 7/2481* (2013.01); *B05B 12/008* (2013.01); *B29B 7/7452* (2013.01); *G01P 13/008* (2013.01); *B05B 7/066* (2013.01); *B05B 7/0815* (2013.01); *B05B 7/2424* (2013.01)

(58) Field of Classification Search
CPC ...... B05B 7/0815; B05B 7/066; B05B 7/086; B05B 7/2472; B05B 7/0408; B05B 7/2408
USPC ........... 239/303, 304, 307, 379, 74, 569, 345, 239/406, 418, 417.5
See application file for complete search history.

(56) References Cited

U.S. PATENT DOCUMENTS 2,757,048 A 7/1956 Balmer
2,864,653 A 12/1958 Liedberg et al.
(Continued)

FOREIGN PATENT DOCUMENTS

DE 102008010562 A1 9/2009
EP 0063707 11/1982
(Continued)

*Primary Examiner* — Davis Hwu
(74) *Attorney, Agent, or Firm* — Ingrassia Fisher & Lorenz, P.C.

(57) ABSTRACT

This invention is directed to a spray device for spraying two or more components. The two or more components are maintained separated in the spray device and are mixed post atomization. This invention is also directed to a gravity fed spray gun and a system for spraying two or more components. This invention is further directed to a kit for converting an existing conventional single-component spray gun typically used for spraying a single component to a two-component spray gun for spraying two components.

20 Claims, 11 Drawing Sheets

(51) Int. Cl.
  *G01P 13/00* (2006.01)
  *B05B 7/06* (2006.01)
  *B05B 7/08* (2006.01)

(56) References Cited

U.S. PATENT DOCUMENTS

| | | | |
|---|---|---|---|
| 3,049,439 A | 8/1962 | Coffman | |
| 3,066,874 A | 12/1962 | Becker | |
| 3,093,311 A * | 6/1963 | Morris et al. | 239/142 |
| 3,799,403 A | 3/1974 | Porbst et al. | |
| 4,824,017 A | 4/1989 | Mansfield | |
| 4,927,079 A | 5/1990 | Smith | |
| 4,955,544 A | 9/1990 | Kopp | |
| 5,052,623 A | 10/1991 | Nordeen | |
| 5,639,027 A | 6/1997 | Fritz | |
| 5,669,557 A | 9/1997 | Barrett et al. | |
| 5,713,519 A | 2/1998 | Sandison et al. | |
| 5,799,876 A | 9/1998 | Isler | |
| 6,264,113 B1 | 7/2001 | Dingler | |
| 7,201,289 B2 | 4/2007 | Bhatia | |
| 7,311,265 B2 | 12/2007 | Bhatia | |
| 8,210,452 B2 | 7/2012 | Larson et al. | |
| 2007/0246565 A1 * | 10/2007 | Turnbull | 239/74 |
| 2010/0270401 A1 | 10/2010 | Charpie et al. | |

FOREIGN PATENT DOCUMENTS

| | | |
|---|---|---|
| GB | 842959 | 8/1960 |
| WO | 9513878 A1 | 5/1995 |
| WO | 03097246 A1 | 11/2003 |
| WO | 2005092934 A1 | 10/2005 |
| WO | 2009086335 A1 | 7/2009 |
| WO | 2010151666 A1 | 12/2010 |
| WO | 2010151762 A1 | 12/2010 |
| WO | 2011100003 A1 | 8/2011 |
| WO | 2011100004 A1 | 8/2011 |

* cited by examiner

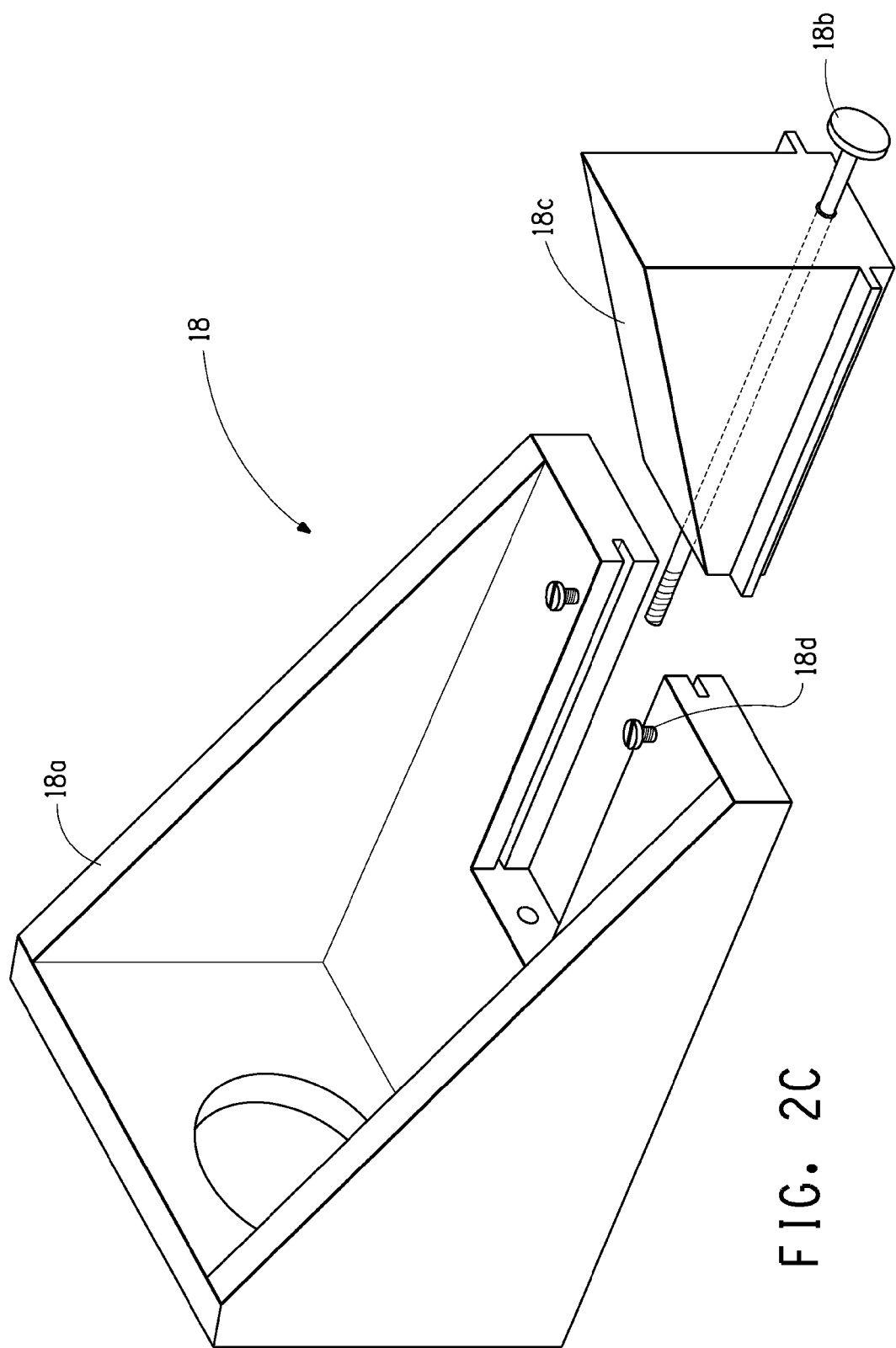

TWO-COMPONENT SPRAY DEVICE AND USE THEREOF

CROSS-REFERENCE TO RELATED APPLICATION

This application is a continuation of International Application No. PCT/US2010/053294, filed Oct. 20, 2010, which was published under PCT Article 21(2), and which claims priority from U.S. Provisional Application Ser. No. 61/304,524 (filed Feb. 15, 2010), the disclosures of which are incorporated by reference herein for all purposes as if fully set forth.

FIELD OF INVENTION

The present invention is directed to a spray device for spraying two or more components. This invention is specifically directed to a spray device for spraying a coating composition having two or more components.

BACKGROUND OF INVENTION

Coatings on automotives or other objects typically comprise polymer networks formed by multiple reactive components of a coating composition. The coatings are typically applied over a substrate such as automobile vehicle body or body parts using a spray device or other coating application techniques and then cured to form a coating layer having such polymer networks.

Currently, the multiple reactive components of the coating composition are typically mixed together to form a pot mix prior to spraying and placed in a cup-like reservoir or container that is attached to a spraying device such as a spray gun. Due to the reactive nature of the multiple reactive components, the pot mix will start to react as soon as they are mixed together causing continued increase in viscosity of the pot mix. Once the viscosity reaches a certain point, the pot mix becomes practically un-sprayable. The possibility that the spray gun itself may become clogged with crosslinked polymer materials is also disadvantageous. The time it takes for the viscosity to increase to such point where spraying becomes ineffective, generally a two-fold increase in viscosity, is referred to as "pot life".

One way to extend "pot life" is to add a greater amount of thinning solvent, also known as thinning agent, to the pot mix. However, thinning agent, such as organic solvent, can contribute to increased emissions of volatile organic compounds (VOC) and can also increase curing time.

Other attempts to extend "pot life" of a pot mix of a coating composition have focused on "chemical-based" solutions. For example, it has been suggested to include modifications of one or more of the reactive components or certain additives that would retard polymerization reaction of the multiple components in the pot mix. The modifications or additives must be such that the rate of curing is not adversely affected after the coating is applied to the surface of a substrate.

Another approach is to mix one or more key components, such as a catalyst, together with other components of the coating composition immediately prior to spraying. One example is described in U.S. Pat. No. 7,201,289 in that a catalyst solution is stored in a separate dispenser and being dispensed and mixed with a liquid coating formulation before the coating formulation is atomized.

Yet another approach is to separately atomize two components, such as a catalyst and a resin, of a coating composition, and mix the two atomized components after spray. One such example is described in U.S. Pat. No. 4,824,017. However, such approach requires atomization of two components separately by using separate pumps and injection means for each of the two components.

STATEMENT OF INVENTION

This invention is directed to a spray gun for spraying a coating composition comprising a first component and a second component, said spray gun comprising:
(A) a spray gun body (1) comprising a carrier inlet (12), a first inlet (10) connected to a first connection path (10a);
(B) a tubular nozzle casing (6) having a nozzle (13), said tubular nozzle casing being housed within said spray gun body (1);
(C) a hollow spray needle (9) having a longitudinal channel (9a) therein, a channel opening (13a) at one end of said hollow spray needle, and a second inlet (8) at the other end of said hollow spray needle distal to said channel opening (13a), wherein at least a portion of said hollow spray needle (9) is housed in said tubular nozzle casing (6) and said hollow spray needle (9) is configured to slide in said tubular nozzle casing (6) between a spray position and a closed position;
(D) an inlet valve for controlling said second inlet (8); and
(E) a detachable coupling assembly (18) affixed externally to said spray gun body distal to said nozzle; wherein said second inlet (8), said inlet valve and said detachable coupling assembly are configured so that said second inlet is open at said spray position and is closed at said closed position;
wherein:
said first component and said second component are maintained separated in said spray gun;
said first inlet is configured to receive said first component by gravity and connected to said first connection path that is further connected to a spray passage defined by said tubular nozzle casing and said hollow spray needle for conveying said first component to said nozzle; and
said second inlet is configured to receive said second component by gravity and connected to said longitudinal channel for conveying said second component to said nozzle when said hollow spray needle is at said spray position.

This invention is also directed to a kit for converting a spray gun to spray a coating composition having a first component and a second component, said kit comprising:
(a) a hollow spray needle (9) having a longitudinal channel (9a) therein, a channel opening (13a) at one end of said hollow spray needle, and a second inlet (8) at the other end of said hollow spray needle distal to said channel opening (13a);
(b) an inlet valve for controlling said second inlet (8); and
(c) a detachable coupling assembly (18), wherein:
when assembled to said spray gun, at least a portion of said hollow spray needle (9) is housed in a tubular nozzle casing (6) and functionally coupled to a trigger (22) of said spray gun, and said hollow spray needle (9) is configured to slide in said tubular nozzle casing (6) between a spray position and a closed position as controlled by said trigger (22); said second inlet (8), said inlet valve and said detachable coupling assembly (18) are configured so that said second inlet is open at said spray position and is closed at said closed position.

This invention is also directed to a method using the spray gun of this invention for producing a layer of a coating composition comprising a first component and a second component on a substrate.

DETAILED DESCRIPTION

Figure 1:
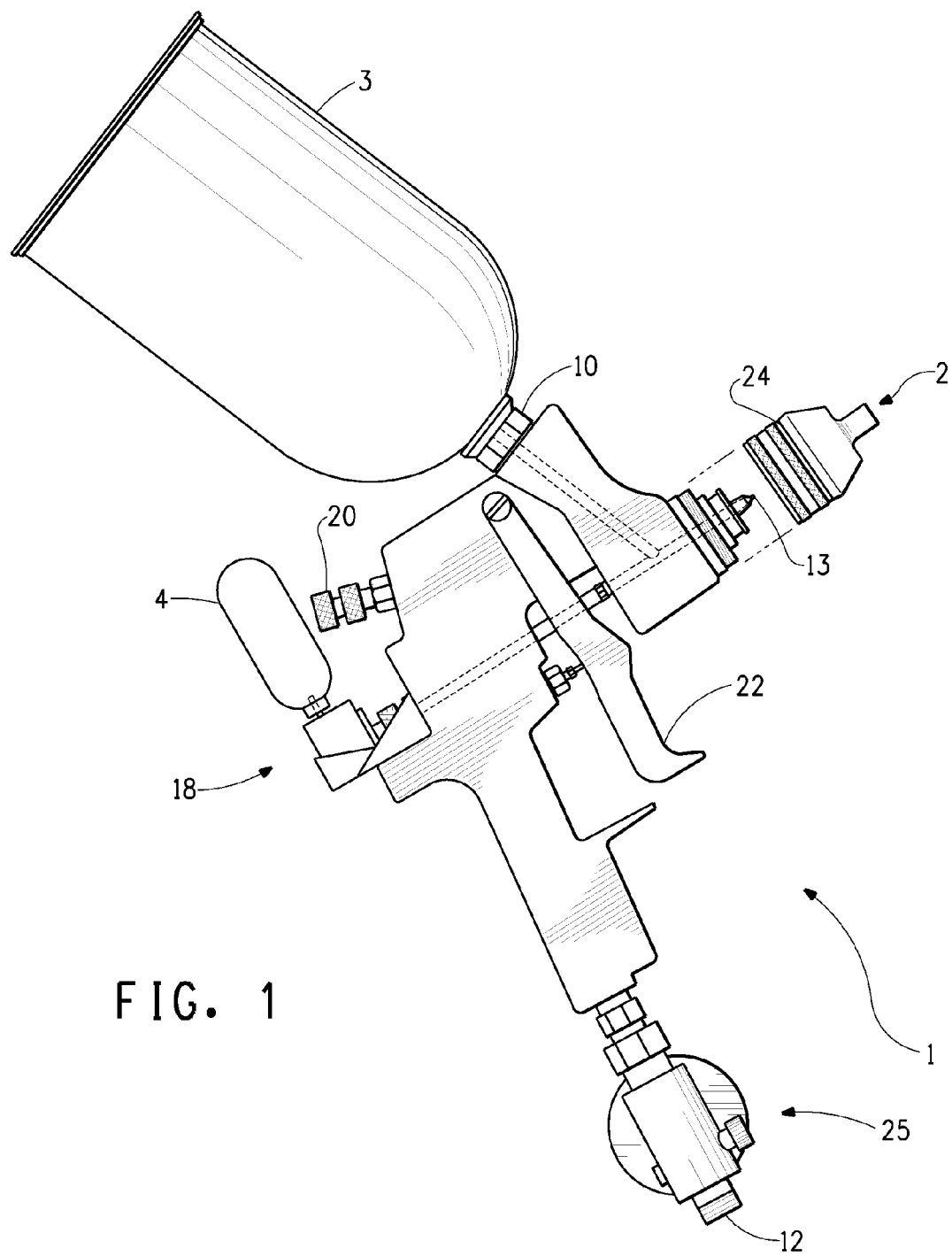
FIG. 1 shows a schematic presentation of an example of a spray gun of this invention.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

"Two-pack coating composition", also known as 2K coating composition, means a thermoset coating composition comprising two components that are stored in separate containers, which are typically sealed for increasing the shelf life of the components of the coating composition. The components are mixed just prior to use to form a pot mix, which has a limited pot life, typically from few minutes, such as 15 minutes to 45 minutes, to few hours, such as 4 hours to 10 hours. The pot mix is applied as a layer of desired thickness on a substrate surface, such as the body or body parts of a vehicle. After application, the layer dries and cures to form a coating on the substrate surface having desired coating properties, such as, desired gloss, mar-resistance, resistance to environmental etching and resistance to degradation by solvent. A typical two-pack coating composition can comprise a crosslinkable component and a crosslinking component.

"One-Pack coating composition", also known as 1K coating composition, means a coating composition comprises multiple ingredients mixed in one single package. A one-pack coating composition can form a coating layer under certain conditions. One example of 1K coating composition can comprise a blocked crosslinking agent that can be activated under certain conditions. One example of the blocked crosslinking agent can be a blocked isocyanate. Another example of 1K coating composition can be a ultraviolet (UV) radiation curable coating composition.

The term "radiation", "irradiation" or "actinic radiation" means radiation that causes, in the presence of a photo initiator, polymerization of monomers that have polymerizable ethylenically unsaturated double bonds, such as acrylic or methacrylic double bonds. Sources of actinic radiation may be natural sunlight or artificial radiation sources. Other examples of radiation can include electron-beam, also known as e-beam. A coating curable by radiation, such as UV, can be referred to as a radiation coating or a UV coating. A UV coating can be typically a 1K coating. A UV curable coating can typically have a UV curable component comprising monomers that have polymerizable ethylenically unsaturated double bonds, such as acrylic or methacrylic double bonds; and one or more photo initiators or radiation activators. Typically, a 1K coating composition, for example a UV monocure coating composition, can be prepared to form a pot mix and stored in a sealed container. As long as said UV mono-cure coating composition is not exposed to UV radiation, said UV mono-cure coating composition can have indefinite pot life.

A coating that can be cured by one curing mechanism, such as by chemical crosslinking alone or by UV radiation alone, can be referred to as a mono-cure coating. A coating that can be cured by both chemical and radiation, such as by both chemical crosslinking and UV radiation, can be referred to as a dual-cure coating.

"Low VOC coating composition" means a coating composition that includes less than 0.6 kilograms per liter (5 pounds per gallon), preferably less than 0.53 kilograms (4.4 pounds per gallon) of volatile organic component, such as certain organic solvents. The phrase "volatile organic component" is herein referred to as VOC. VOC level is determined under the procedure provided in ASTM D3960.

"Crosslinkable component" includes a compound, oligomer, polymer or copolymer having functional crosslinkable groups positioned in each molecule of the compound, oligomer, the backbone of the polymer, pendant from the backbone of the polymer, terminally positioned on the backbone of the polymer, or a combination thereof. One of ordinary skill in the art would recognize that certain crosslinkable group combinations would be excluded from the crosslinkable component of the present invention, since, if present, these combinations would crosslink among themselves (self-crosslink), thereby destroying their ability to crosslink with the crosslinking groups in the crosslinking components defined below.

Typical crosslinkable component can have on an average 2 to 25, preferably 2 to 15, more preferably 2 to 5, even more preferably 2 to 3, crosslinkable groups selected from hydroxyl, acetoacetoxy, carboxyl, primary amine, secondary amine, epoxy, anhydride, imino, ketimine, aldimine, or a combination thereof.

The crosslinkable component can have protected crosslinkable groups. The "protected" crosslinkable groups are not immediately available for curing with crosslinking groups, but first must undergo a reaction to produce the crosslinkable groups. Examples of suitable protected crosslinkable components having protected crosslinkable groups can include, for example, amide acetal, orthocarbonate, orthoacetate, orthoformate, spiroorthoester, orthosilicate, oxazolidine or combinations thereof.

The protected crosslinkable groups generally are not crosslinkable without an additional chemical transformation. The chemical transformation for these groups can be a deprotection reaction such as hydrolysis reaction that unprotects the group to form a crosslinkable group that can then be reacted with the crosslinking component to produce a crosslinked network. Each one of these protected groups, upon the deprotection reaction, forms at least one crosslinkable group. For example, upon hydrolysis, an amide acetal can form an amide diol or one of two amino alcohols. As another example, the hydrolysis of an orthoacetate can form a hydroxyl group.

The crosslinkable component can contain compounds, oligomers and/or polymers that have crosslinkable functional groups that do not need to undergo a chemical reaction to produce the crosslinkable group. Such crosslinkable groups are known in the art and can include, for example, hydroxyl, acetoacetoxy, thiol, carboxyl, primary amine, secondary amine, epoxy, anhydride, imino, ketimine, aldimine, silane, aspartate or a suitable combination thereof.

Suitable activators for deprotecting the protected crosslinkable component can include, for example, water, water and acid, organic acids or a combination thereof. In one embodiment, water or a combination of water and acid can be used as an activator to deprotect the crosslinkable component. For example, water or water with acid can be an activator for a coating described in POT publication WO2005/092934, published on Oct. 6, 2005, wherein water activates hydroxyl groups by hydrolyzing orthoformate groups that block the hydroxyl groups from reacting with crosslinking functional groups.

"Crosslinking component" is a component that includes a compound, oligomer, polymer or copolymer having crosslinking functional groups positioned in each molecule of the compound, oligomer, the backbone of the polymer, pendant from the backbone of the polymer, terminally positioned on the backbone of the polymer, or a combination thereof, wherein these functional groups are capable of crosslinking with the crosslinkable functional groups on the crosslinkable component (during the curing step) to produce a coating in the form of crosslinked structures or networks. One of ordinary skill in the art would recognize that certain crosslinking group/crosslinkable group combinations would be excluded from the present invention, since they would fail to crosslink and produce the film forming crosslinked structures or networks.

Typical crosslinking component can be selected from a compound, oligomer, polymer or copolymer having crosslinking functional groups selected from the group consisting of isocyanate, amine, ketimine, melamine, epoxy, polyacid, anhydride, and a combination thereof. It would be clear to one of ordinary skill in the art that generally certain crosslinking groups from crosslinking components crosslink with certain crosslinkable groups from the crosslinkable components.

A coating composition can further comprise a catalyst, an initiator, an activator, a curing agent, or a combination thereof. A coating composition can also comprise a radiation activator if the coating composition is a radiation curable coating composition, such as a UV curable coating composition.

A catalyst can initiate or promote the reaction between reactants, such as crosslinkable functional groups of a crosslinkable component and crosslinking functional groups of a crosslinking component of a coating composition. A wide variety of catalysts can be used, such as, tin compounds, including organotin compounds such as dibutyl tin dilaurate; or tertiary amines, such as, triethylenediamine. These catalysts can be used alone or in conjunction with carboxylic acids, such as, acetic acid. One example of commercially available catalysts is dibutyl tin dilaurate as Fascat® series sold by Arkema, Bristol, Pa., under respective trademark.

An activator can activate one or more components of a coating composition. For example, water can be an activator for a coating described in PCT publication WO20051092934, published on Oct. 6, 2005, wherein water activates hydroxyl groups by hydrolyzing orthoformate groups that block the hydroxyl groups from reacting with crosslinking functional groups.

An initiator can initiate one or more reactions. Examples can include photo initiators and/or sensitizers that cause photopolymerization or curing of a radiation curable coating composition, such as a UV curable coating composition upon radiation, such as UV irradiation. Many photo initiators are known to those skilled in the art and can be suitable for this invention.

A radiation activator can be activated by radiation and then initiate or catalyze subsequent one or more reactions. One example can be photolatent catalyst available from Ciba Specialty Chemicals.

A curing agent can react with other components of a coating composition to cure the coating composition into a coating. For example, a crosslinking component, such as isocyanate, can be a curing agent for a coating comprising a crosslinkable hydroxyl component. On the other hand, a crosslinkable component can be a curing agent for a crosslinking component.

In conventional coating practice, components of a two-pack coating composition are mixed immediately prior to spraying to form a pot mix which has a limited pot life, wherein said components can include a crosslinking component, a crosslinkable component, necessary catalysts, and other components necessary as determined by those skilled in the art. In addition to the limited pot life, many catalysts can change its activity in the pot mix. For example, some catalysts can be sensitive to the trace amount of water in the pot mix since water can cause hydrolysis and hence inactivation of the catalyst.

This invention is directed to a spray gun for spraying a coating composition comprising a first component and a second component onto a substrate. The spray gun can comprise:

(A) a spray gun body (1) comprising a carrier inlet (12), a first inlet (10) connected to a first connection path (10a);

(B) a tubular nozzle casing (6) having a nozzle (13), said tubular nozzle casing being housed within said spray gun body (1);

(C) a hollow spray needle (9) having a longitudinal channel (9a) therein, a channel opening (13a) at one end of said hollow spray needle, and a second inlet (8) at the other end of said hollow spray needle distal to said channel opening (13a), wherein said hollow spray needle (9) is partially positioned and is slidable in said tubular nozzle casing (6) between a spray position and a closed position;

(D) an inlet valve for controlling said second inlet (8); and (E) a detachable coupling assembly (18) affixed externally to said spray gun body distal to said nozzle; wherein said second inlet (8), said inlet valve and said detachable coupling assembly are configured so that said second inlet is open at said spray position and is closed at said closed position;

wherein:

said first component and said second component are maintained separated in said spray gun;

said first inlet is configured to receive said first component by gravity and connected to said first connection path that is further connected to a spray passage defined by said tubular nozzle casing and said hollow spray needle for conveying said first component to said nozzle; and said second inlet is configured to receive said second component by gravity and connected to said longitudinal channel for conveying said second component to said nozzle when said hollow spray needle is at said spray position.

The spray gun can further comprise a main reservoir (3) (FIG. 1) for conveying said first component to said first inlet by gravity. The spray gun can further comprise a second reservoir (4) for conveying said second component to said second inlet by gravity. The spray gun can further comprise a flow control means (11a) coupled to the second inlet for regulating flow of the second component. The flow control means can be a valve, a flow restrictor, a quick dry connector, or any other devices that can control flow rate.

The detachable coupling assembly (18) can comprise a frame for attaching to the spray gun, a second connection coupling (11) for connecting to the second reservoir, a valve coupling for controlling the second inlet (8), and one or more fasteners, such as those shown as 18b, 18d, 18b' or 18d' for attaching or adjusting the position of the valve coupling to the frame. In one example, the detachable coupling assembly can have a wedge frame (18a) (FIGS. 2A, 2B and 2C) and a wedge valve coupling (18c). In another example, the frame can be a sliding frame (18a') (FIGS. 3A, 3B and 3C) and a sliding valve coupling (18c'). The valve coupling (18c or 18c') can be used in combination with the inlet vale to control the second inlet (8). When the hollow spray needle is at the closed position, the valve coupling (18c or 18c') can cause the inlet valve, and hence second inlet (8) to be closed. When the hollow spray needle is at the spray position, the valve coupling (18c or 18c') can cause the inlet valve, and hence the second inlet (8) to be open.

Figure 2A:
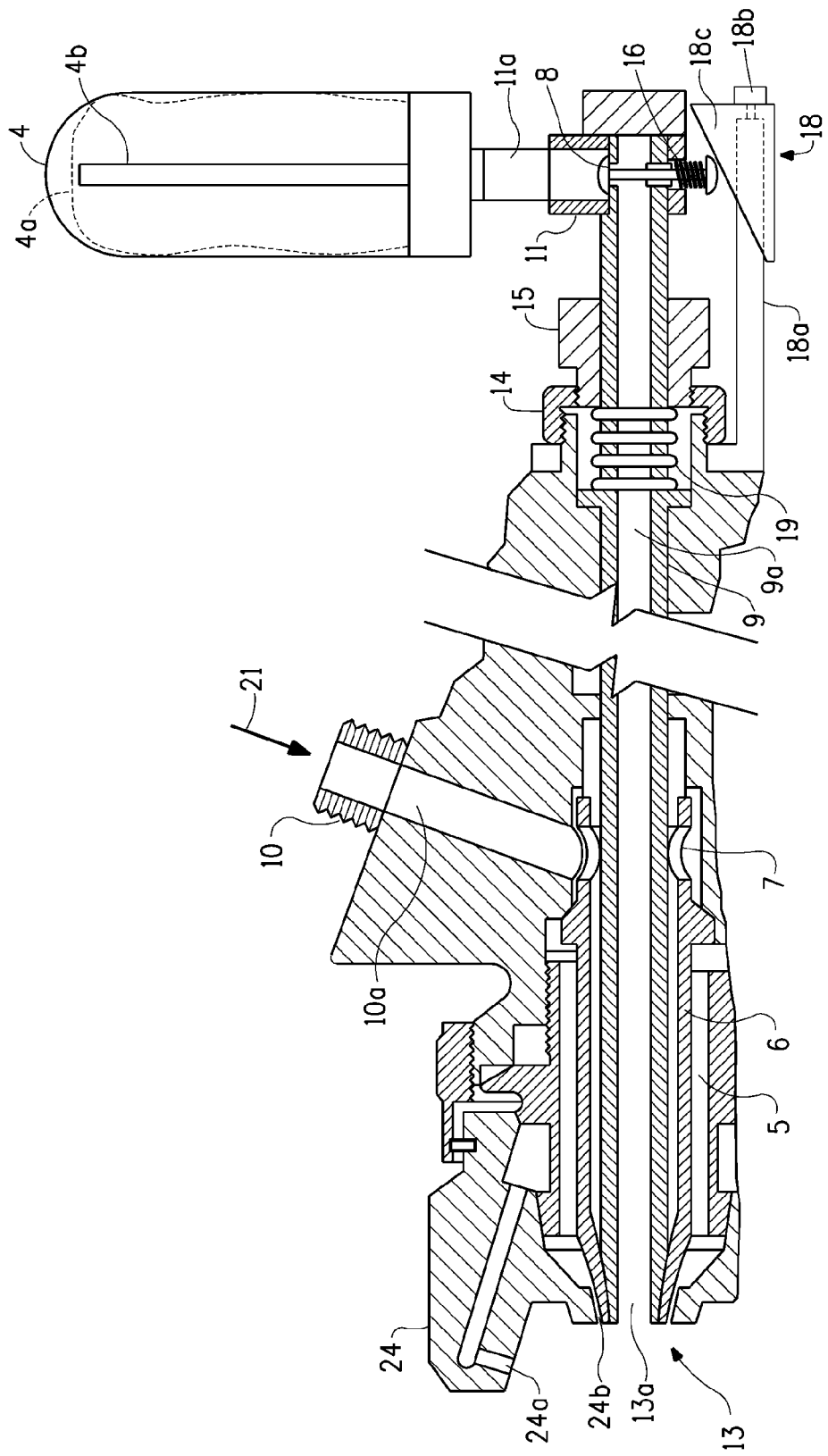
FIG. 2 shows schematic presentations of an example of a spray gun having a hollow spray needle, an inlet valve and a detachable coupling assembly. (A) The hollow spray needle at the closed position. (B) The hollow spray needle at the spray position. (C) Schematic presentations of an example of the hollow spray needle, inlet valve and the detachable coupling assembly.
Figure 2B:
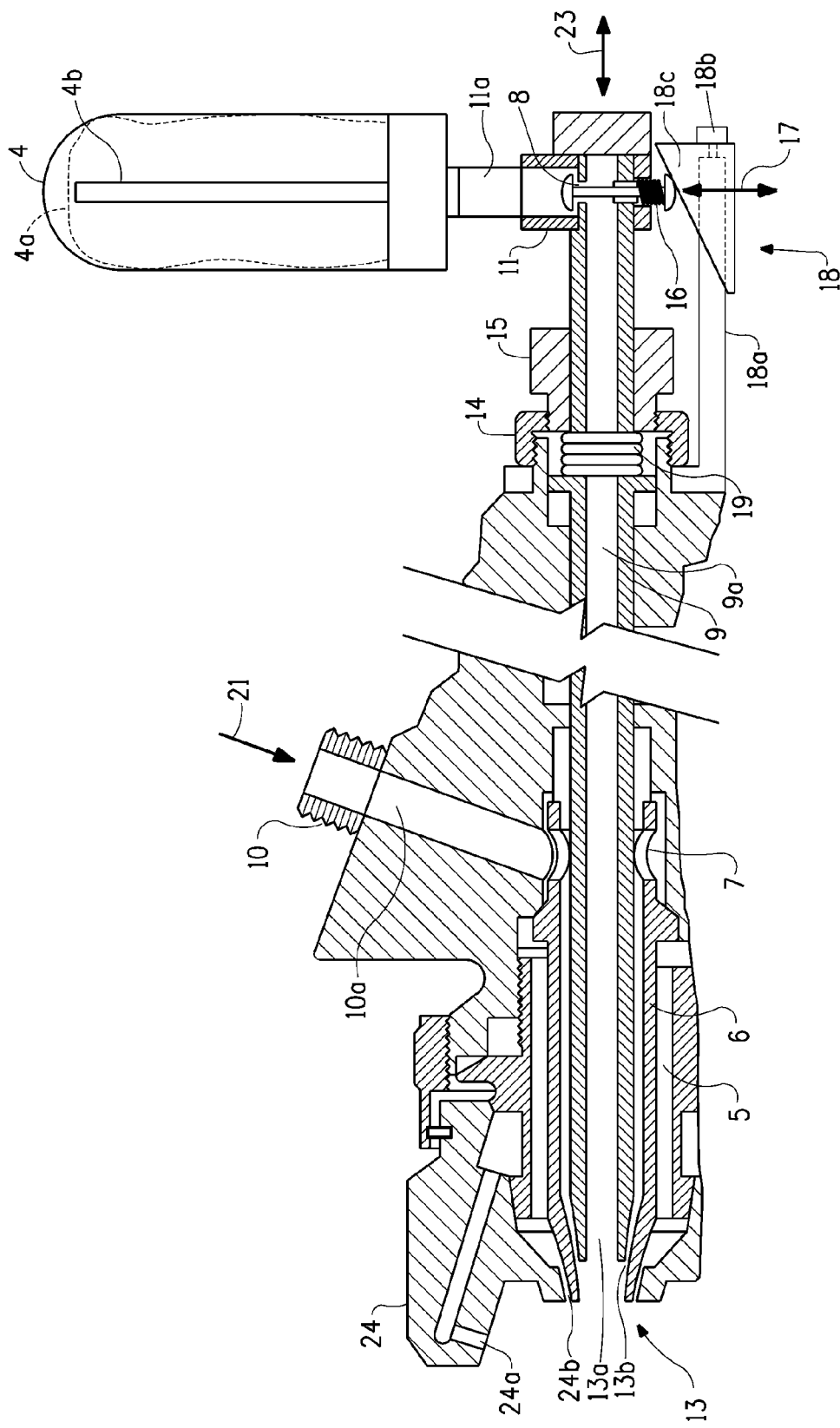
Figure 3A:
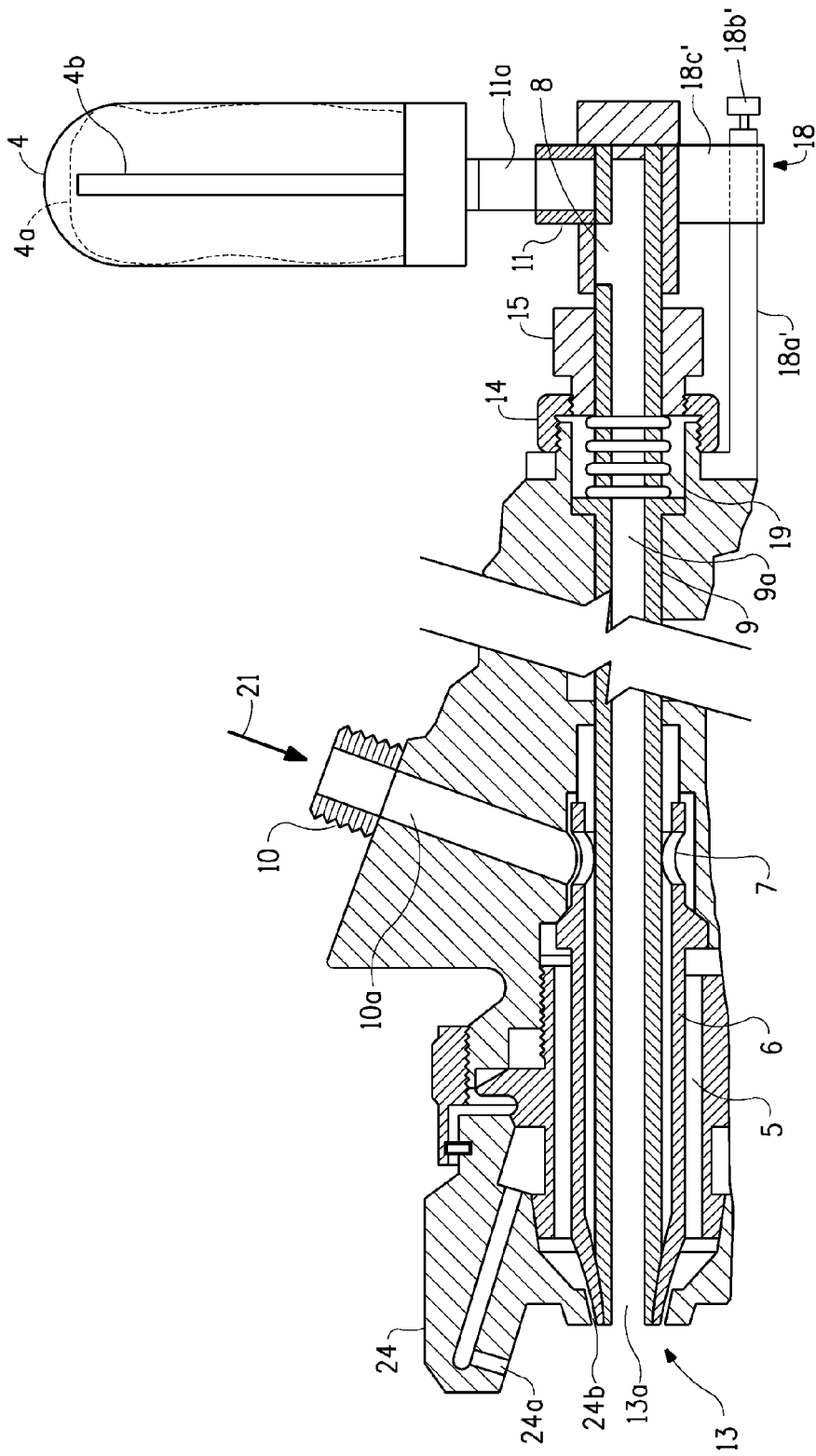
FIG. 3 shows schematic presentations of another example of a spray gun having a hollow spray needle, an inlet valve and a detachable coupling assembly. (A) The hollow spray needle at the closed position. (B) The hollow spray needle at the spray position. (C) Schematic presentations of another example of the hollow spray needle, the inlet valve and the detachable coupling assembly.

The inlet valve can be selected from a pin valve, a sliding valve, or a combination thereof. The pin valve can comprise a seal pin (16) that is positioned at the second inlet (8) with at least a portion of the seal pin seated within the second inlet (8) perpendicular to the hollow spray needle and can be moved in the direction perpendicular to the longitudinal axis of the hollow spray needle. The seal pin can be seated at the second inlet (8) in a seated position to seal the second inlet so the second inlet is closed. A spring means can be used to maintain the seal pin at the seated position when the hollow spray needle is not at the spray position. The seal pin can also partial seal the second inlet. The seal pin can be moved to an open position causing the second inlet to be open. The seal pin can be moved by the valve coupling (18c). One example of the configuration is shown in FIG. 2 with the seal pin (16) in the seated position and the second inlet closed (FIG. 2A), or with the seal pin (16) in the open position and the second inlet open (FIG. 2B). When the second inlet is open, the longitudinal channel (9a) can be connected with the second connection coupling and the second reservoir so the second component can flow into the longitudinal channel and be sprayed out of the nozzle. When the second inlet is closed, the longitudinal channel can be disconnected with the second connection coupling and the second reservoir so the second component can not flow into the longitudinal channel.

Figure 3B:
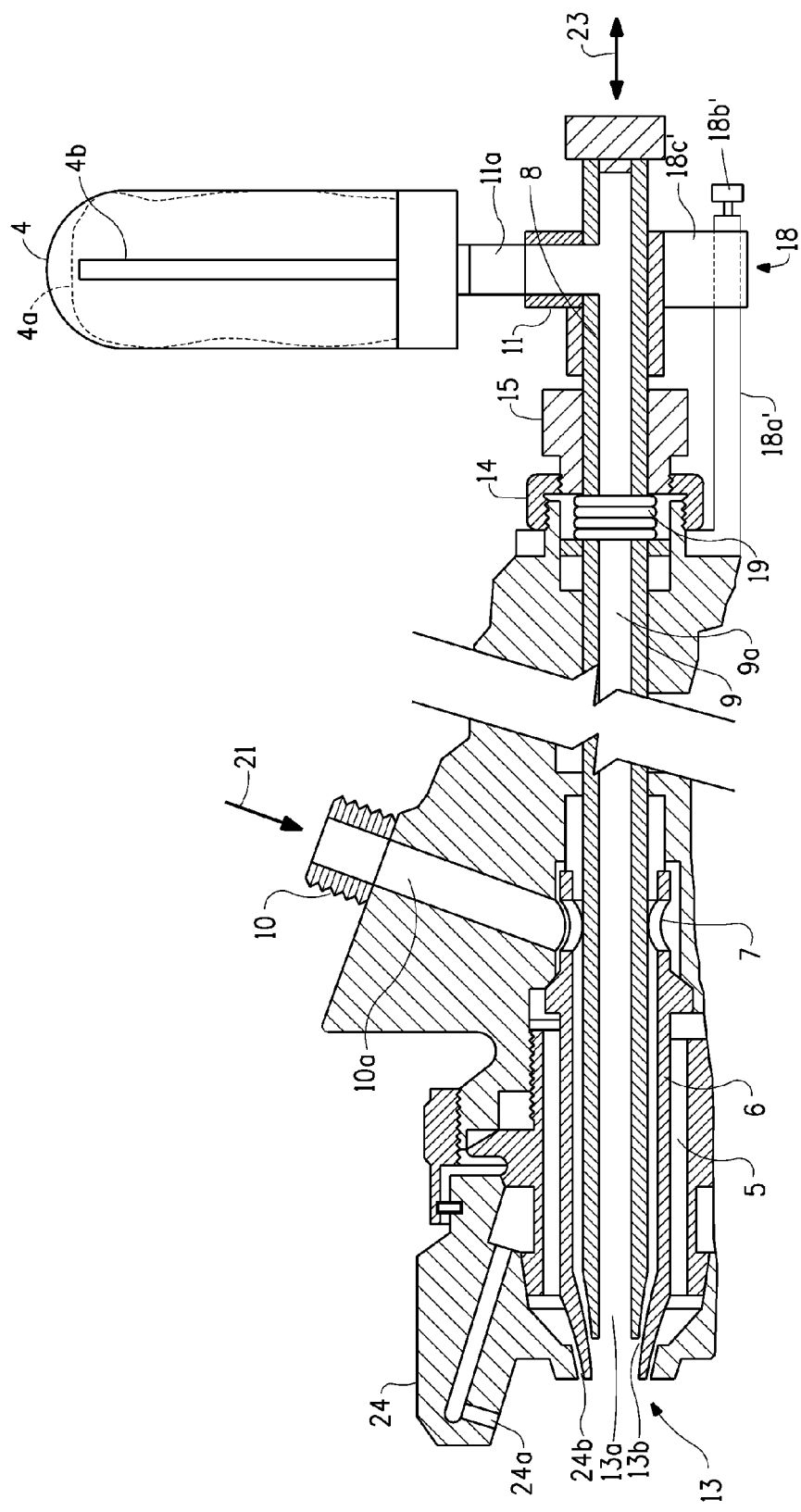
Figure 3C:
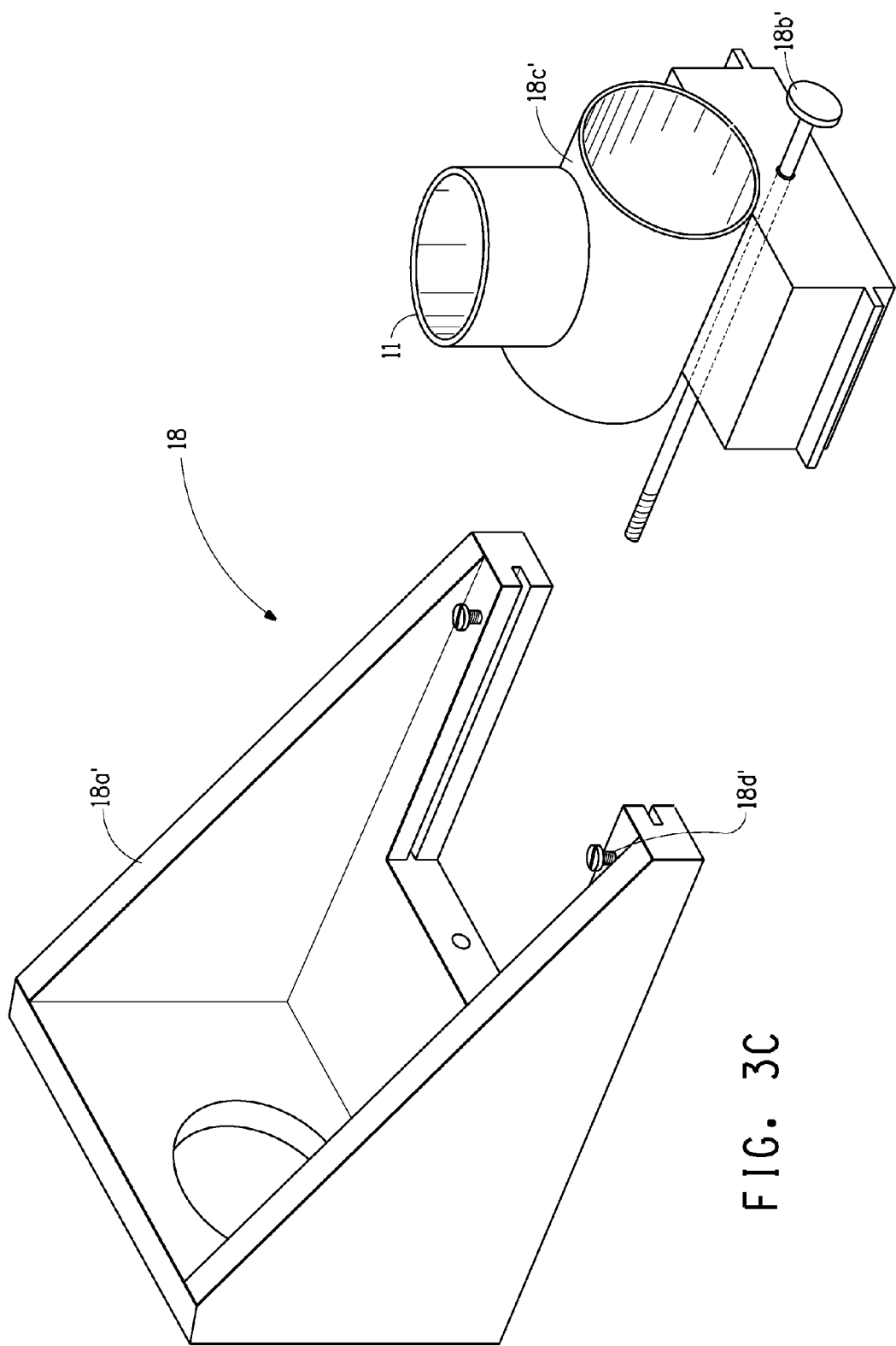

The sliding valve can comprise a seal sleeve. The seal sleeve can be a stand alone part or be a part of the valve coupling. The sliding valve can slide between a closed valve position and an open valve position. When the sliding valve is at the closed valve position, the second inlet (8) and the second connection coupling (11) are misaligned causing the second inlet to be closed. When the sliding valve is at the open valve position, the second inlet (8) and the second connection coupling (11) are aligned causing the second inlet to be open. The hollow spray needle and the sliding valve can be assembled and configured in such a way so that the sliding valve is at the closed valve position when the hollow spray needle is at the closed position (FIG. 3A) and the sliding valve is at the open valve position when the hollow spray needle is at the spray position (FIG. 3B). One example of the seal sleeve can be the sliding valve coupling (18c') as shown in FIG. 3C. The sliding valve coupling (18c') can be assembled into the sliding frame (18a') and can be configured or adjusted via one or more fasteners (18b' and 18d').

Figure 4A:
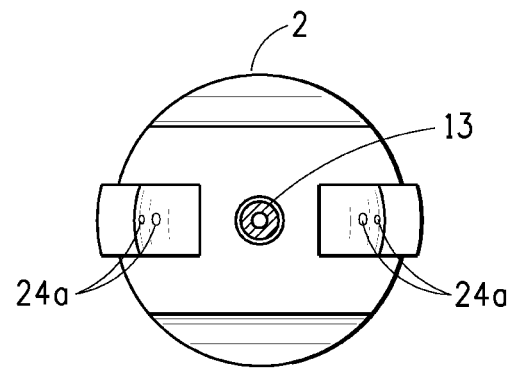
FIG. 4 shows a frontal view of an example of a nozzle-air cap assembly. (A) Frontal view. (B) Details of the frontal view
Figure 4B:
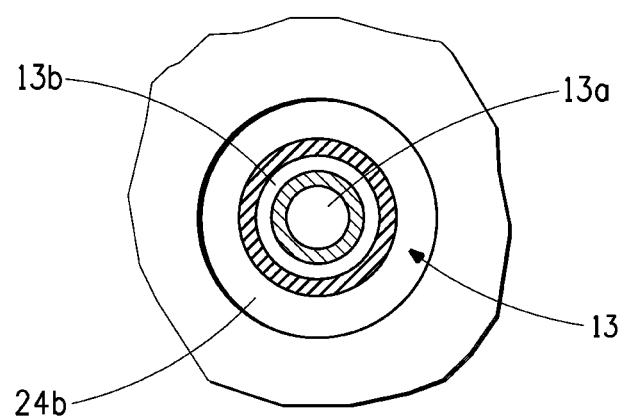

As shown in FIG. 1, the spray gun body (1) can have additional multiple parts, controls, such as carrier coupling (12) for coupling to a source of a carrier, such as compressed air; a carrier regulator assembly (25) for regulating and measuring flow rate and pressure of the carrier; a coating flow regulator (not shown) for regulating flow of the first component that is stored in a main reservoir (3), and other mechanisms necessary for proper operation of a spray gun known to those skilled in the art. Additional control or parts can include, such as a trigger (22) and a spray fan regulator (20) for regulating compressed carrier such as compressed air jetting out from a set of shaping air jets (24a) (FIGS. 4A and 4B) for forming desired spray shape, such as a fan-shape. Typically, multiple channels, connectors, connection paths and mechanical controls can be assembled within the spray gun body. The spray gun body can also provide further assembly or operation mechanisms for additional parts or controls, such as an air cap (24) that can form a spray nozzle-air cap assembly (2). The carrier can be discharged from the space (24b) defined by the air cap and the nozzle (13) (FIG. 4B).

The spray passage can be configured to disconnect from said first connection path when said hollow spray needle is at said closed position. Both the longitudinal channel and the spray passage can be configured to disconnect at the same time when said hollow spray needle is at said closed position: the longitudinal channel can be configured to disconnect from said second connection coupling and said spray passage can be configured to disconnect from said first connection path.

The tubular nozzle casing or said hollow spray needle can have a tapered opening at the nozzle and the hollow spray needle can be configured to seal the nozzle at said closed position. Some examples are shown in FIGS. 2A, 2B, 3A and 3B.

The hollow spray needle (9) can be sliding in the bi-direction shown by the bi-directional arrow (23) and can be configured to cause controlled connections between the longitudinal channel and the second connection coupling: the longitudinal channel can be disconnected from said second connection coupling when said hollow spray needle is at said closed position and the longitudinal channel can be connected to said second connection coupling when said hollow spray needle is at said spray position.

The first inlet (10) can be constructed or configured onto the spray gun body through means known to those skilled in the art. The first inlet is connected to the nozzle for conveying a first component of the coating composition to the nozzle. The main reservoir (3) is not pressurized and the first inlet can be typically positioned at the upper side of the spray gun body so the first component can be conveyed to the firs inlet and further into the spray gun by gravity during normal spray operation, such as hand-held spraying. The spray gun can comprise a second reservoir (4) for conveying a second component to the second inlet by gravity during normal spray operation, such as hand-held spraying. The second reservoir can be positioned separately from the main reservoir (3) (FIG. 1). The reservoirs can be attached to the spray gun body using adaptors, couplings, or flow control means. In one example, a connector can be coupled to the second inlet (8) for easy connection, flow rate control, or a combination thereof. One example of the connector can be a quick dry connector. Additional couplings, connectors, adaptors can also be used.

Figure 5A:
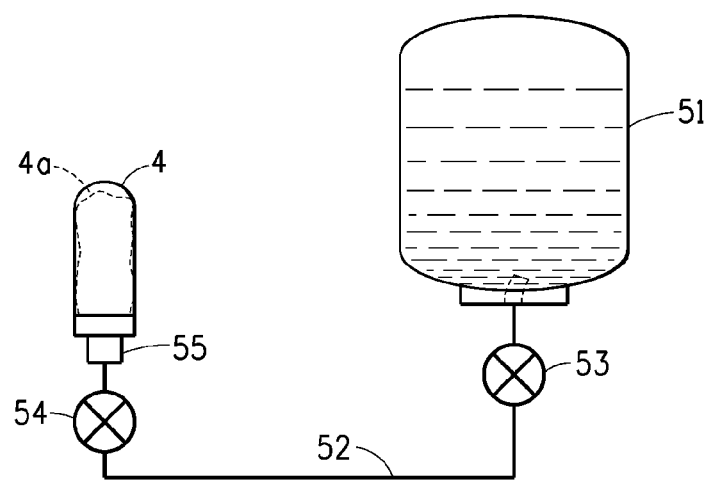
FIG. 5 shows schematic presentations of examples for filling the second reservoir, (A) Filling the second reservoir via gravity. (B) Filling the second reservoir using a pump.
Figure 5B:
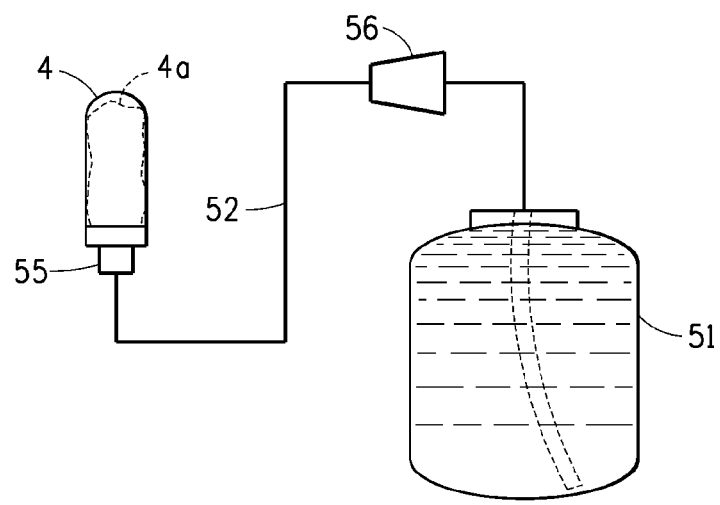

The second reservoir (4) can comprise a hard capsule having fixed shape or volume, a collapsible enclosure having flexible shape or volume, or a combination thereof. In one example, a combination of a hard capsule and a collapsible enclosure (4a) can be suitable. The second reservoir (4) can further comprise a transparent opening (4b) for easy monitoring of the contents within. The second reservoir (4) can comprise a sensor to monitor the contents within. The purpose of the transparent opening (4b) or the sensor is to provide warning to an operator when the second reservoir (4) is empty. The hard capsule can made of plastic, metal, glass, or a combination thereof. The collapsible enclosure (4a) can be made from plastic or other flexible materials. The hard capsule can be ventilated. The second reservoir can be filled with a master container (51) by gravity (FIG. 5A) via a set of connection tubing (52), one or more connection couplings (55), and one or more flow control devices (53 or 54). The second reservoir can also be filled with a master container (51) using a power source, such as a pump (56) (FIG. 5B). It is preferred that the air in the collapsible enclosure (4a) is removed prior to filling to avoid trapping air bubbles with in. The one or more connection couplings can be a quick dry connector or any other types easy connectors to minimize trapping air or spill the content.

Figure 6A:
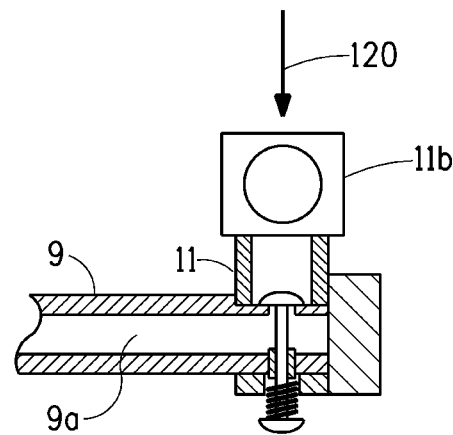
FIG. 6 shows schematic presentations of examples of the flow indicator. (A) and (B) Schematic presentations of flow indicators (11*b*) attached to the second connection coupling (11) in various examples of configurations. (C) Schematic presentation of an example of the flow indicator with one or more flaps (110). (D) Schematic presentation of an example of the flow indicator with one or more wheels (111). (E) Schematic presentation of an example of an electronic flow indicator (112).
Figure 6B:
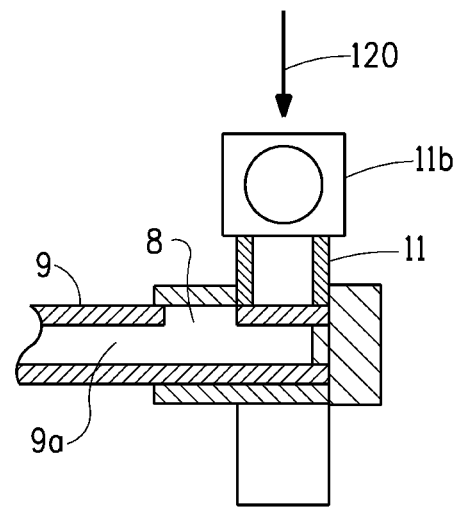

The spray gun can further comprise a flow indicator (11b, FIGS. 6A and 6B) or a combination of the flow indicator (11b) and the flow control means (11a). The flow indicator can be a stand alone device, a part of, or a combination of any of the adaptors, couplings, or connectors. In one example, the flow indicator (11b) can be combined with the second connection coupling (11). In another example, the flow indicator can be part of the second reservoir (4). In yet another example, the flow indicator can be used in combination with the flow control means (11a). In yet another example, the flow indicator can be used in combination with the flow control means (11a) and the second connection coupling (11). The flow indicator can be selected from a visual flow indicator, an electronic flow indicator, or a combination thereof.

Figure 6C:
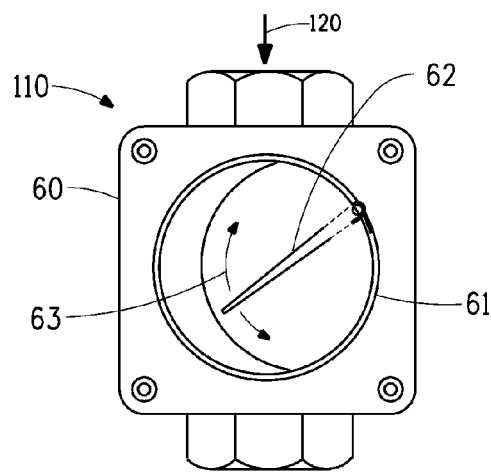
Figure 6D:
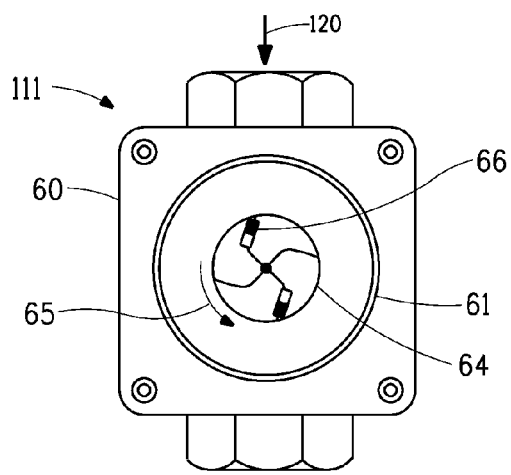

The visual flow indicator can comprise an indicator body (60) and an indicator means. The indicator means can comprise one or more transparent windows (61), one or more flaps (62), one or more wheels (64), one or more visual markers (66), or a combination thereof. In one example, the flow indicator can comprise an indicator body and a transparent window. The flow of the second component as indicated by the arrow (120) can be viewed through the transparent window. In another example, the flow indicator (110) (FIG. 6C) can comprise a flap (62). When the second component is flowing through, the flap can be forced by the flow to change position as indicated by the arrow (63). In yet another example, the flow indicator (111) (FIG. 6D) can comprise a wheel (64). When the second component is flowing through, the wheel can rotate as indicated by the directional arrow (65). A visual marker (66) can be used in combination of the flap or the wheel. In one example, a high contrast visual marker, such as black-and-white marker, can be affixed to the wheel for easy monitoring of the wheel rotation. The wheel itself can also be made with patterns so a stationary wheel and a rotating wheel can be easily distinguished. Commercial flow indicators can be suitable.

Figure 6E:
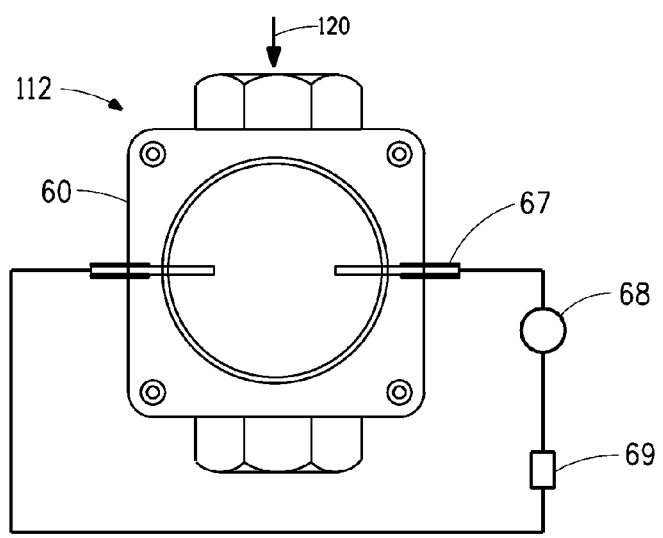

The electronic flow indicator can comprise one or more flow sensors (67). In one example, the electronic flow indicator (112) (FIG. 6E) can comprise the one or more flow sensors, one or more signal output devices (68), such as a visual or audio signal device; and at least one power source (69). The electronic flow indicator can be configured to produce signal, such as visual or audio signals, when the second component is flowing through.

The electronic flow indicator can also be configured to produce signal, such as visual or audio signals, when the second component is not flowing through.

This invention is further directed to a kit for converting a spray gun to spray a coating composition having a first component and a second component. The kit can comprise:

(a) a hollow spray needle (9) having a longitudinal channel (9a) therein, a channel opening (13a) at one end of said hollow spray needle, and a second inlet (8) at the other end of said hollow spray needle distal to said channel opening (13a);

(b) an inlet valve for controlling said second inlet (8); and (c) a detachable coupling assembly (18), wherein:

when assembled to said spray gun, at least a portion of said hollow spray needle (9) is housed in a tubular nozzle casing (6) and functionally coupled to a trigger (22) of said spray gun, and said hollow spray needle (9) is configured to slide in said tubular nozzle casing (6) between a spray position and a closed position as controlled by said trigger (22); said second inlet (8), said inlet valve and said detachable coupling assembly (18) are configured so that said second inlet is open at said spray position and is closed at said closed position.

The inlet valve can be selected from a pin valve, a sliding valve, or a combination thereof, as described above. The pin valve can comprise a seal pin (16) that is positioned at the second inlet (8) with at least a portion of the seal pin seated within the second inlet (8) perpendicular to the hollow spray needle.

Any of the aforementioned detachable coupling assembly can be suitable for the kit. The detachable coupling assembly, as described above, can be assembled externally to said spray gun body.

The kit can further comprise the aforementioned flow indicator (11b).

This invention is further directed to a two-component spray gun comprising the kit of this invention or modified by the kit of this invention.

One advantage of this invention is that an existing conventional spray gun typically used for spraying a single component can be easily converted to a two-component spray gun for spraying two components. The hollow spray needle can replace a conventional needle of an existing conventional spray gun. The frame and the valve coupling can be easily attached externally to the existing conventional spray gun without major change in the structure of the existing conventional spray gun.

This invention is further directed to a method for producing a layer of a coating composition comprising a first component and a second component on a substrate. The method can comprise the steps of:

i) providing a spray gun comprising:
(A) a spray gun body (1) comprising a carrier inlet (12), a first inlet (10) connected to a first connection path (10*a*);
(B) a tubular nozzle casing (6) having a nozzle (13), said tubular nozzle casing being housed within said spray gun body (1);
(C) a hollow spray needle (9) having a longitudinal channel (9*a*) therein, a channel opening (13*a*) at one end of said hollow spray needle, and a second inlet (8) at the other end of said hollow spray needle distal to said channel opening (13*a*), wherein said hollow spray needle (9) is partially positioned and is slidable in said tubular nozzle casing (6) between a spray position and a closed position;
(D) an inlet valve for controlling said second inlet (8); and
(E) a detachable coupling assembly (18) affixed externally to said spray gun body distal to said nozzle; wherein said second inlet (8), said inlet valve and said detachable coupling assembly are configured so that said second inlet is open at said spray position and is closed at said closed position;

wherein:
said first component and said second component are maintained separated in said spray gun;
said first inlet is configured to receive said first component by gravity and connected to said first connection path that is further connected to a spray passage defined by said tubular nozzle casing and said hollow spray needle for conveying said first component to said nozzle; and
said second inlet is configured to receive said second component by gravity and connected to said longitudinal channel for conveying said second component to said nozzle when said hollow spray needle is at said spray position;

ii) providing the first component of said coating composition to the first inlet and the second component of said coating composition to said second inlet;

iii) producing atomized said first component and atomized said second component to form an atomized coating mixture by supplying a pressurized carrier to said carrier outlet through said carrier inlet and sliding said hollow spray needle to said spray position; and iv) applying said atomized coating mixture over said substrate forming said layer thereon.

The method can further comprise the step of curing said layer of said coating composition. The coating composition can be cured at ambient temperatures, such as in a range of from 15° C. to 35° C., or at elevated temperatures, such as in a range of from 35° C. to 400° C.

The pressurized carrier can be selected from compressed air, compressed gas, compressed gas mixture, or a combination thereof. The substrate can be a vehicle, vehicle body, or vehicle body parts.

The coating composition can be selected from a lacquer coating composition, a chemical curable coating composition, a radiation curable coating composition, or a chemical and radiation dual-cure coating composition. In one example, the first component can comprise a crosslinkable and a crosslinking component and said second component comprises a catalyst or a latent catalyst. In another example, the first component can also comprise a radiation curable component and the second component can comprise a photo initiator. In yet another example, the first component can comprise a crosslinkable component, a crosslinking component and a radiation curable component, and said second component can comprise a catalyst, an initiator, a radiation activator, or a combination thereof. In yet another example, the first component can comprise a crosslinkable component and said second component can comprise a crosslinking component. In yet another example, the first component can comprise a radiation curable component and a crosslinkable component, and the second component can comprise a crosslinking component. In yet another example, the first component can comprise protected crosslinkable groups and a crosslinking component, and the second component can comprise water and optionally an acid. In yet another example, the first component can comprise protected crosslinkable groups, and the second component comprises a crosslinking component, water, and optionally an acid. In yet another example, the second component can be selected from a catalyst, an initiator, an activator, a radiation activator, a curing agent, or a combination thereof. In yet another example, the coating mixture can have a coating viscosity that is increasing upon time and the first component and the second component can be at essentially constant individual viscosity upon time.

Another advantage of this invention can include the ability for controlling viscosity of a coating composition. The coating mixture can have a coating viscosity that is increasing upon time, while the first component and the second component can be at essentially constant individual viscosity. That means that the first component and the second component can be at an individual viscosity essentially constant at the beginning and the end of spray operation. This can be particularly useful for spraying coating compositions that viscosity increases very rapidly if all components are mixed together. By utilizing this invention, individual components of such coating compositions can be mixed after atomization. The viscosity of individual component can be essentially constant during spray operation.

This invention can further be directed to a method for controlling viscosity of a coating composition comprising a first component and a second component, wherein said first component reacts with said second component causing increasing viscosity of said coating composition. The method can comprise the steps of:

i) providing a two-component spray gun comprising:

(A) a spray gun body (1) comprising a carrier inlet (12), a first inlet (10) connected to a first connection path (10*a*);

(B) a tubular nozzle casing (6) having a nozzle (13), said tubular nozzle casing being housed within said spray gun body (1);

(C) a hollow spray needle (9) having a longitudinal channel (9*a*) therein, a channel opening (13*a*) at one end of said hollow spray needle, and a second inlet (8) at the other end of said hollow spray needle distal to said channel opening (13*a*), wherein said hollow spray needle (9) is partially positioned and is slidable in said tubular nozzle casing (6) between a spray position and a closed position;

(D) an inlet valve for controlling said second inlet (8); and (E) a detachable coupling assembly (18) affixed externally to said spray gun body distal to said nozzle; wherein said second inlet (8), said inlet valve and said detachable coupling assembly are configured so that said second inlet is open at said spray position and is closed at said closed position;

wherein:

said first component and said second component are maintained separated in said spray gun;

said first inlet is configured to receive said first component by gravity and connected to said first connection path that is further connected to a spray passage defined by said tubular nozzle casing and said hollow spray needle for conveying said first component to said nozzle; and said second inlet is configured to receive said second component by gravity and connected to said longitudinal channel for conveying said second component to said nozzle when said hollow spray needle is at said spray position;

ii) providing the first component of said coating composition to the first inlet and the second component of said coating composition to the second inlet;

iii) producing atomized said first component and atomized said second component to form an atomized coating mixture by supplying a pressurized carrier to said carrier outlet through said carrier inlet and sliding said hollow spray needle to said spray position; and iv) applying said atomized coating mixture over said substrate forming said layer thereon;

wherein said coating mixture has a coating viscosity that is increasing upon time and said first component and said second component are at essentially constant individual viscosity upon time.

This invention is further directed to a method for converting a single component spray gun to a two-component spray gun. The method can comprise the steps of:

1) providing a hollow spray needle (9) having a longitudinal channel (9a) therein, a channel opening (13a) at one end of said hollow spray needle, and a second inlet (8) at the other end of said hollow spray needle distal to said channel opening (13a);

2) providing an inlet valve for controlling said second inlet (8); and 3) providing a detachable coupling assembly (18), and 4) assembling said hollow spray needle (9), the inlet valve and said detachable coupling assembly (18) to said spray gun so that at least a portion of said hollow spray needle (9) is housed in a tubular nozzle casing (6) and functionally coupled to a trigger (22) of said spray gun, and said hollow spray needle (9) is configured to slide in said tubular nozzle casing (6) between a spray position and a closed position as controlled by said trigger (22); said second inlet (8), said inlet valve and said detachable coupling assembly (18) are configured so that said second inlet is open at said spray position and is closed at said closed position. The detachable coupling assembly (18) can comprise the aforementioned frame, the second connection coupling, the valve coupling, and the one or more fasteners.

The substrate can be wood, plastic, leather, paper, woven and nonwoven fabrics, metal, plaster, cementitious and asphaltic substrates, and substrates that have one or more existing layers of coating thereon. The substrate can be vehicle body or vehicle parts thereof.

Although coating compositions with multiple coating components are specifically described here, this invention can also be used for a composition having multiple components that need to be mixed to form a mixed composition. With this invention, a first component of the composition can be atomized by a spray device and a second or a subsequent component of the composition can be siphoned into the atomized first component to form the mixed composition.

What is claimed is:

1. A spray gun for spraying a coating composition having a first component and a second component, said spray gun comprising:

(A) a spray gun body comprising a carrier inlet, a first inlet connected to a first connection path;

(B) a tubular nozzle casing having a nozzle, said tubular nozzle casing being housed within said spray gun body;

(C) a hollow spray needle having a longitudinal channel therein, a channel opening at one end of said hollow spray needle, and a second inlet at the other end of said hollow spray needle distal to said channel opening, wherein said hollow spray needle is partially positioned and is slidable in said tubular nozzle casing between a spray position and a closed position;

(D) an inlet valve for controlling said second inlet; and (E) a detachable coupling assembly affixed externally to said spray gun body distal to said nozzle; wherein said second inlet, said inlet valve and said detachable coupling assembly are configured so that said second inlet is open at said spray position and is closed at said closed position;

wherein:

said first component and said second component are maintained separated in said spray gun such that said first component and said second component remain separated until sprayed out of said nozzle;

said first inlet is configured to receive said first component by gravity and connected to said first connection path that is further connected to a spray passage defined by said tubular nozzle casing and said hollow spray needle for conveying said first component to said nozzle; and said second inlet is configured to receive said second component by gravity and connected to said longitudinal channel for conveying said second component to said nozzle when said hollow spray needle is at said spray position.

2. The spray gun of claim 1, wherein said detachable coupling assembly comprises a second connection coupling for connecting to a second reservoir; and wherein said longitudinal channel is configured to disconnect from said second connection coupling when said hollow spray needle is at said closed position.

3. The spray gun of claim 1, wherein said spray passage is configured to disconnect from said first connection path when said hollow spray needle is at said closed position.

4. The spray gun of claim 2, wherein said longitudinal channel is configured to disconnect from said second connection coupling and said spray passage is configured to disconnect from said first connection path when said hollow spray needle is at said closed position.

5. The spray gun of claim 1 further comprising a main reservoir for conveying said first component to said first inlet by gravity.

6. The spray gun of claim 1 further comprising a second reservoir for conveying said second component to said second inlet by gravity.

7. The spray gun of claim 1 further comprising a flow control means coupled to the second inlet for regulating flow of the second component.

8. The spray gun of claim 1, wherein said tubular nozzle casing or said hollow spray needle has a tapered opening at the nozzle.

9. The spray gun of claim 1, wherein the hollow spray needle is configured to seal the nozzle at said closed position.

10. The spray gun of claim 1, wherein said detachable coupling assembly comprises a frame, a second connection coupling, a valve coupling, and one or more fasteners.

11. The spray gun of claim 1, wherein said inlet valve is selected from a pin valve, a sliding valve, or a combination thereof.

12. A kit for converting a spray gun to spray a coating composition having a first component and a second component, said kit comprising:
(a) a hollow spray needle having a longitudinal channel therein, a channel opening at one end of said hollow spray needle, and a second inlet at the other end of said hollow spray needle distal to said channel opening, wherein said hollow spray needle is configured to be housed in a tubular nozzle casing of said spray gun;
(b) an inlet valve for controlling said second inlet, wherein said second inlet is configured to receive said second component for conveying said second component within said hollow spray needle to a nozzle;
(c) a detachable coupling assembly; and
(d) a first inlet connected to a first connection path that is further connected to a spray passage defined by said tubular nozzle casing and said hollow spray needle for conveying said first component to said nozzle, wherein said first inlet is configured to receive said first component, wherein:
when assembled to said spray gun, at least a portion of said hollow spray needle is housed in said tubular nozzle casing and functionally coupled to a trigger of said spray gun, and said hollow spray needle is configured to slide in said tubular nozzle casing between a spray position and a closed position as controlled by said trigger; said second inlet, said inlet valve and said detachable coupling assembly are configured so that said second inlet is open at said spray position and is closed at said closed position, and wherein said spray gun is configured to separately maintain said first component and said second component and spray said first component and said second component out of said nozzle separately.

13. The kit of claim 12, said inlet valve is selected from a pin valve, a sliding valve, or a combination thereof.

14. The kit of claim 13, wherein said pin valve comprises a seal pin that is positioned at the second inlet with at least a portion of the seal pin seated within the second inlet perpendicular to the hollow spray needle.

15. The kit of claim 12, wherein said detachable coupling assembly is assembled externally to said spray gun body.

16. The kit of claim 12, wherein said detachable coupling assembly comprises a frame, a second connection coupling, a valve coupling, and one or more fasteners.

17. The kit of claim 16, wherein said valve coupling is selected from a wedge valve coupling, a sliding valve coupling, or a combination thereof.

18. The kit of claim 12 further comprising a flow indicator.

19. The kit of claim 18, wherein said flow indicator is selected from a visual flow indicator, an electronic flow indicator, or a combination thereof.

20. A two-component spray gun comprising the kit of claim 12.

* * * * *